Patented Oct. 13, 1942

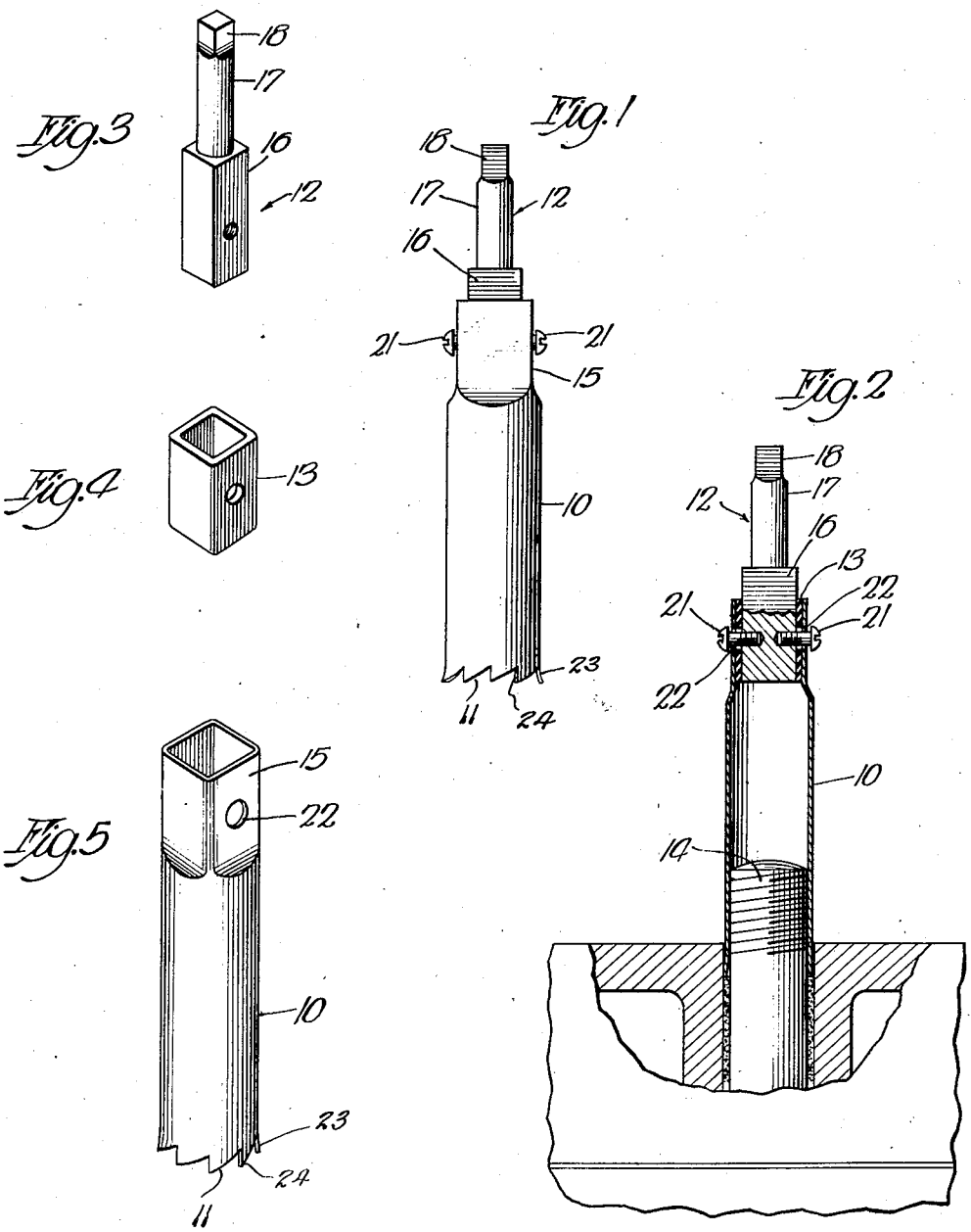
Oct. 13, 1942.  J. W. SHELBURNE  2,298,975
CORROSION CUTTER
Filed Oct. 12, 1940
INVENTOR.
John W. Shelburne
BY Louis R. Gileson
ATTY.

2,298,975

UNITED STATES PATENT OFFICE 2,298,975

CORROSION CUTTER

John W. Shelburne, Hannibal, Mo.

Application October 12, 1940, Serial No. 360,892

2 Claims. (Cl. 77—69)

Great difficulty is experienced in removing plates, such as the headplates of internal combustion engines, which are secured in service position by means of stud bolts, because of the development of corrosion around the bolt, which in time becomes exceedingly hard and must be destroyed or broken down. For such removal an annular saw is employed, which because of its thinness is liable to be fractured, or have its teeth broken off.

Such fractures are overcome by my present invention, which provides for slight relative rotary and cushioned movement of the shank of the tool on the initial application of turning pressure. An additional feature of the invention provides for the removal of the saw cuttings.

The invention is fully hereinafter described, and is illustrated in its preferred form in the accompanying drawing, in which—

Fig. 1 is a side elevation of the cutter;

Fig. 2 is a longitudinal sectional view thereof, as applied to a stud bolt securing a cylinder head to an engine body; and Figs. 3, 4, and 5 are side elevations of the several parts of the implement disassembled.

In the illustrated embodiment of the invention the tool comprises a tubular body portion 10, at one end of which the cutting teeth 11 are formed; a shank element 12 and a cushioning element 13 connecting the shank with the body.

The body 10 is formed of steel and is very thin. Its internal diameter is such that it will have a close but sliding fit on the stud bolt 14, with which it is intended to be used. The upper end portion 15 of the body 10 is angular in cross section, being shown as square.

The shank 12 comprises a body portion 16 of the same form as the portion 15 of the case but of less cross-sectional dimensions. The length of the portion 16 is such that it projects beyond the squared section of the tubular body, and is adapted for the application of a hand wrench. The upper portion 17 of the shank is rounded for convenient engagement with the attaching element of an electric motor. The outer end 18 of the shank is shown as squared for engagement by a small hand wrench when but little power is required.

The preferred form of the cushioning means comprises a tube 13 of rubber conforming in shape, size and length to the interior of the squared portion 15 of the body of the tool, and which is preferably cemented to the inner surface thereof. The body portion 16 of the shank fits snugly within the cushioning element and is securely cemented thereto. This means of applying the cushioning element securely, yet yieldingly, connects the shank and body of the tool, and by the use of good material the attachment is durable.

The shank and casing are interlocked by means of studs 21, 21 projecting laterally from the shank through openings in the casing, of such size that the relative movement of the shank and casing is within the elastic limit of the cushioning element.

The cushioning action, when the above described construction is followed, is effective both in connection with the rotary and longitudinal application of the tool to the work; the teeth are not only set in motion gradually but are similarly applied to the material to be cut away. Shock and the accompanying sudden development of destructive stress are avoided. Not only is the life of the tool prolonged, but the delay incident to the removal of broken teeth is avoided.

The efficiency of the tool is increased if provision is made for automatically removing the cuttings. This I accomplish by setting some of the teeth outward, the remainder being aligned with the body 10 as indicated at 23, 24. As thus formed the kerf is slightly widened outwardly, and an outlet is provided for the cuttings.

Various changes can be made in the device within the scope of the invention. While I regard the rubber cushioning element as satisfactory, I recognize that other forms of cushion devices for breaking the initial shock incident to the sudden application of power may be advantageously used.

I claim as my invention:

1. In a corrosion cutter in combination, a tubular body having an annular series of cutting teeth at one end, and being angular in cross-section adjacent its opposite end, a turning shank projecting into such angular section, and a rubber filler interposed between the shank and the walls of such section, and being nonrotative relative to both of such elements.

2. In a corrosion cutter in combination, a tubular body having an annular series of cutting teeth at one end, and being angular in cross section adjacent to its opposite end, a turning shank adapted to engage operatively said angular section, and a resilient filler interposed between the shank and said section, and being non-rotative relative to both of said elements.

JOHN W. SHELBURNE.